(12) United States Patent
Gupta et al.

(10) Patent No.: US 12,259,794 B2
(45) Date of Patent: Mar. 25, 2025

(54) EXTENSIVE RECOVERY POINT MANAGEMENT USING TAGS

(71) Applicant: Nutanix, Inc., San Jose, CA (US)

(72) Inventors: Abhishek Gupta, Vasundhara Ghaziabad (IN); Ajaykumar Rajubhai Bhammar, Gujarat (IN); Brajesh Kumar Shrivastava, Bihar (IN); Kai Tan, Cary, NC (US); Naveen Kumar, Karnataka (IN); Pranab Patnaik, Cary, NC (US); Ramya Uthamarajan, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/237,814

(22) Filed: Aug. 24, 2023

(65) Prior Publication Data

US 2024/0330119 A1    Oct. 3, 2024

(30) Foreign Application Priority Data

Mar. 28, 2023    (IN) .............................. 202341022616

(51) Int. Cl.
  *G06F 11/00*    (2006.01)
  *G06F 11/14*    (2006.01)
(52) U.S. Cl.
  CPC ...... *G06F 11/1464* (2013.01); *G06F 11/1469* (2013.01); *G06F 2201/84* (2013.01)
(58) Field of Classification Search
  CPC ............. G06F 11/1463; G06F 11/1469; G06F 2201/84
  See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Joshua P Lottich
(74) *Attorney, Agent, or Firm* — Cesari and McKenna, LLP

(57) ABSTRACT

A technique enables coordination of unrelated software components to facilitate extensive recovery point management on a snapshot or recovery point through the use of a flexible tag structure. The tag is organized and arranged as a {key=value,[value] . . . } structure wherein the key denotes an operation that requires coordination between the unrelated software components and the value(s) denote multi-cardinality that provide parameters for coordination of the operation. The multi-cardinality aspect of the flexible tag structure provides a set of values associated with the key of the tag that enables a software component and/or protocol to insert its value(s) into the tag structure for its interpretation. The technique thus provides an extensible model where multiple components/protocols use the tag to coordinate operations on the RP by conveying certain meaning/interpretations of the tag and its values.

30 Claims, 7 Drawing Sheets

(56) References Cited

U.S. PATENT DOCUMENTS

| | | | |
|---|---|---|---|
| 8,863,124 B1 | 10/2014 | Aron et al. | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 11,436,097 B1 | 9/2022 | Kumar et al. | |
| 11,575,745 B2 | 2/2023 | Tatiparthi et al. | |
| 2020/0099692 A1* | 3/2020 | Jindal | G06F 11/1438 |
| 2022/0114057 A1* | 4/2022 | Govindan | G06F 11/1448 |
| 2022/0179760 A1* | 6/2022 | Manjunath | G06F 11/008 |
| 2022/0309010 A1 | 9/2022 | Jiang et al. | |
| 2022/0374316 A1 | 11/2022 | Kumar | |
| 2022/0398163 A1 | 12/2022 | Bezbaruah et al. | |
| 2024/0273186 A1* | 8/2024 | George | G06F 21/6218 |
| 2024/0275814 A1* | 8/2024 | George | H04L 63/1425 |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https://nutanixbible.com/, dated Nov. 29, 2023, 276 pages.

\* cited by examiner

EXTENSIVE RECOVERY POINT MANAGEMENT USING TAGS

CROSS-REFERENCE TO RELATED APPLICATION

The present application claims the benefit of India Provisional Patent Application Serial No. 202341022616, which was filed on Mar. 28, 2023, by Abhishek Gupta, et al. for EXTENSIVE RECOVERY POINT MANAGEMENT USING TAGS, which is hereby incorporated by reference.

BACKGROUND

Technical Field

The present disclosure relates to snapshots and, more specifically, to management of snapshots embodied as recovery points.

Background Information

A recovery point configuration may represent a set of virtual machines (VMs), volume groups (VGs) or virtual disks (vdisks) captured to reflect one or more point-in-time images or snapshots embodied as recovery points (RPs). Yet there may be situations where RP metadata has attributes that are not sufficient for the needs of different vendor specific applications or workflows in which the RPs are created. These attributes are important for the lifecycle of the RP as used by the workflow or application, e.g., the attributes may be interpreted by the application in a cooperative environment and for which the application or a storage server is expected to take certain actions on behalf of the application. Such actions may not be achievable using vendor specific metadata because the storage server may be unable to interpret the vendor specific metadata stored in the RP metadata. In addition, the storage server may be unable to provide either indexation on such attributes or any interface to query or update these attributes across the RPs.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique configured to enable coordination of unrelated software components (e.g., applications) to facilitate extensive recovery point management on a snapshot or recovery point through the use of a flexible tag structure. The flexible tag structure (tag) is organized and arranged as a {key=value,[value] . . . } structure wherein the key denotes an operation that requires coordination between the unrelated software components (application) and the value(s) denote multi-cardinality that provide parameters for coordination of the operation among the components. As used herein, the multi-cardinality aspect of the flexible tag structure provides a set of values associated with the key of the tag that enables a software component (application and/or protocol implementation) to insert its value(s) into the tag structure for its specific interpretation. The technique thus provides an extensible model where multiple components/applications/protocols use the tag to coordinate operations on the RP by conveying certain meaning/interpretations of the tag and its values.

Illustratively, there are two types of tags: (i) system defined tags that are interpreted by a server which takes appropriate actions based on the value(s) specified in the tag, and (ii) user defined tags (e.g., set and used by an application) that are opaque (unusable) to the server, i.e., the server merely stores these tags and does not perform any action. In an embodiment, the system defined tags are used for client/server coordination among the software components, wherein the key and format of the value(s) of the tags are defined by a server software component and may be visible to other applications (client software components). User defined tags are used for client/client coordination, where both the key and format for the value(s) are defined by client software components and not interpreted by the system software component.

DESCRIPTION

Figure 1:
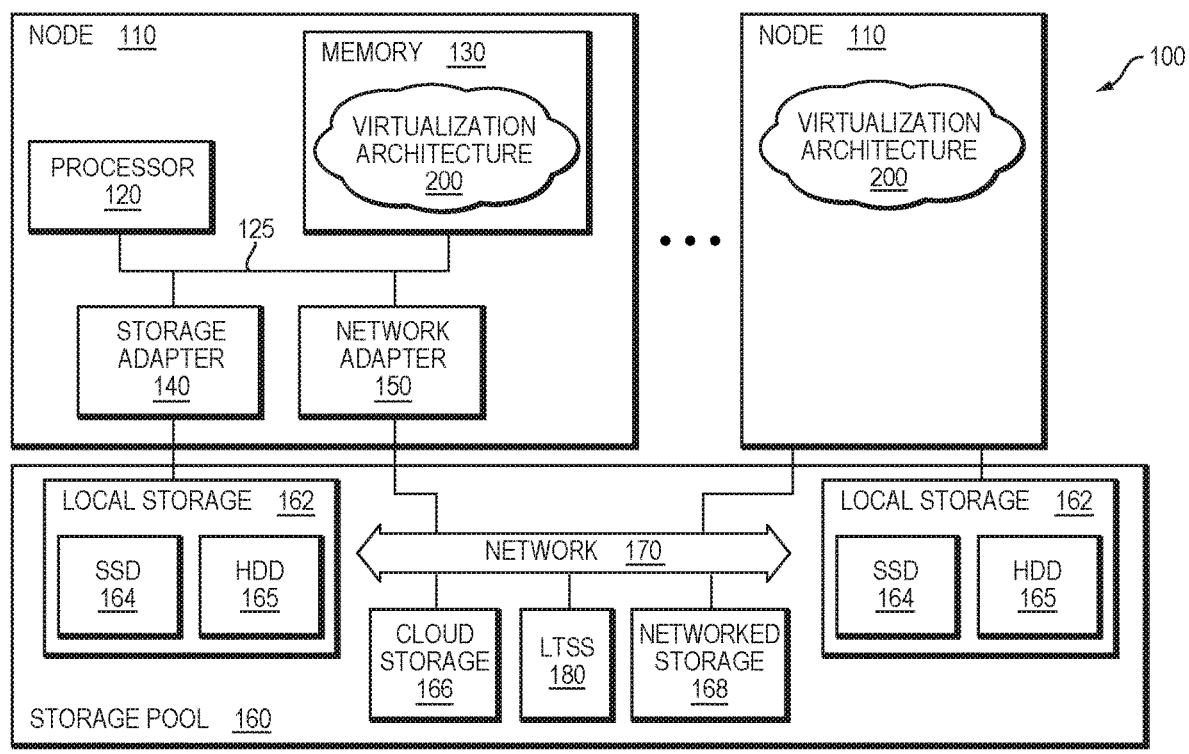
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information. i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network 170, which is illustratively an Ethernet local area network (LAN). The network adapter 150 may thus be embodied as a network interface card having the mechanical, electrical and signaling circuitry needed to connect the node 110 to the network 170. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. A long-term snapshot storage (LTSS 180) service of a backup (e.g., archival) storage system provides storage of large numbers (amounts) of point-in-time images or recovery points (i.e., snapshots) of application workloads on an object store, which may be part of cloud storage 166. Communication over the network may be effected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
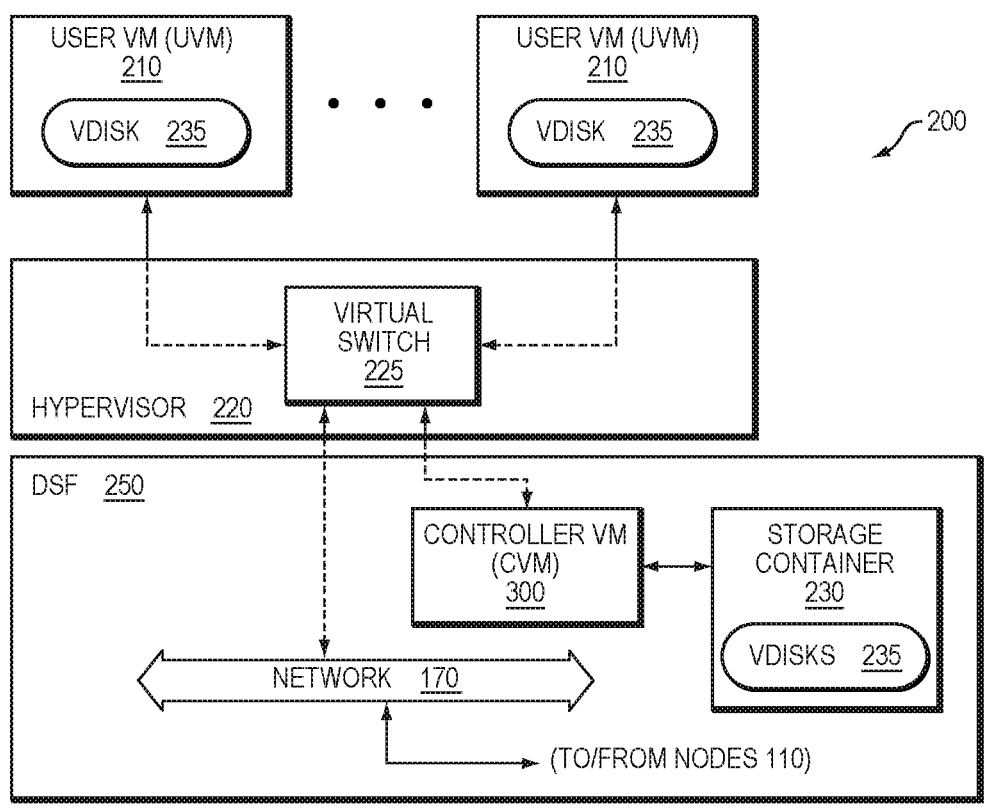
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (ISCSI) protocol. Operations on these filesystem protocols are interposed at the hypervisor 220 and redirected (via virtual switch 225) to the CVM 300, which exports one or more iSCSI. CIFS, or NES targets organized from the storage objects in the storage pool 160 of DSP 250 to appear as disks to the UVMs 210. These targets are virtualized, e.g., by software running on the CVMs, and exported as virtual disks (vdisks) 235 to the UVMs 210. In some embodiments, the vdisk is exposed via ISCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NES request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NES client software may be employed to convert the SCSI-formatted UVM request into an appropriate iSCSI, CIFS or NFS formatted request that can be processed by the CVM 300. As used herein, the terms ISCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
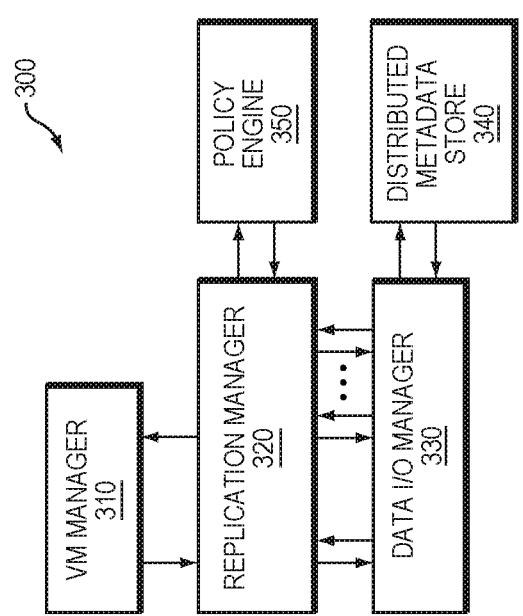
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as services of a storage stack running in a user space of the operating system of the CVM to provide storage and I/O) management services within DSF 250. The processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320 is configured to provide replication and disaster recovery capabilities of DSF 250. Such capabilities include migration/failover of virtual machines and containers, as well as scheduling of snapshots. The replication manager 320 may interact with a policy engine 350 to initiate periodic snapshots, as described herein. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

A snapshot is a point-in-time image of a protected entity, such as VM or vdisk, on which many operations are directed for use cases (e.g., deployments) of a multi-site data replication environment, such as backup or disaster recovery (DR). Data replication generally involves copying or replicating data among one or more nodes 110 of clusters 100 embodied as, e.g., datacenters. The multi-site data replication environment may include two or more datacenters, i.e., sites, which are typically geographically separated by relatively large distances and connected over a communication network, such as a WAN. For example, data at a local datacenter (primary site) may be replicated over the network to one or more remote datacenters (one or more secondary sites) located at geographically separated distances to ensure continuity of data processing operations in the event of a failure of the nodes at the primary site.

Synchronous replication may be used to replicate the data between the sites such that each update to the data at the primary site is copied to the secondary site. For instance, every update (e.g., write operation) issued by a UVM 210 to data designated for copying (i.e., protected data) is continuously replicated from the primary site to the secondary site before the write operation is acknowledged to the UVM. Thus, if the primary site fails, the secondary site has an exact (i.e., mirror copy) of the protected data at all times. Synchronous replication generally does not require the use of snapshots of the data; however, to establish a multi-site data replication environment, a snapshot may be employed to establish a point-in-time reference from which the sites can (re)synchronize the protected data.

In the absence of continuous synchronous replication between the sites, the current state of the protected data at the secondary site always "lags behind" (is not synchronized with) that of the primary site resulting in possible data loss in the event of a failure of the primary site. If a specified amount of time lag in synchronization is tolerable (e.g., 60 mins), then asynchronous (incremental) replication may be selected between the sites, for example, a point-in-time image replication from the primary site to the secondary site is not more than 60 minutes behind. Incremental replication generally involves at least two point-in-time images or snapshots of the data to be replicated, e.g., a base snapshot that is used as a reference and a current snapshot that is used to identify incremental changes to the data since the base snapshot. To facilitate efficient incremental replication in a multi-site data protection environment, a base snapshot is required at each site.

Typically, the base snapshot captures data and metadata (configuration information) of the protected entity at a primary site and is replicated to a secondary site as a recovery point (RP). That is, the captured data and metadata may include an entire state of the protected entity including associated storage objects. Thereafter, periodic incremental snapshots may be generated at the primary site and replicated as RPs to the secondary site. For example in a backup deployment, a backup software component (e.g., a backup application) may be responsible for copying/archiving one or more RPs to cloud storage of a CSP. In a DR deployment, a DR software component (e.g., a control plane application) may monitor the occurrence of a disaster/failure of an application at a primary site and spin-up (instantiate) the application on a secondary site using a RP that was replicated from the primary site.

Figure 4:
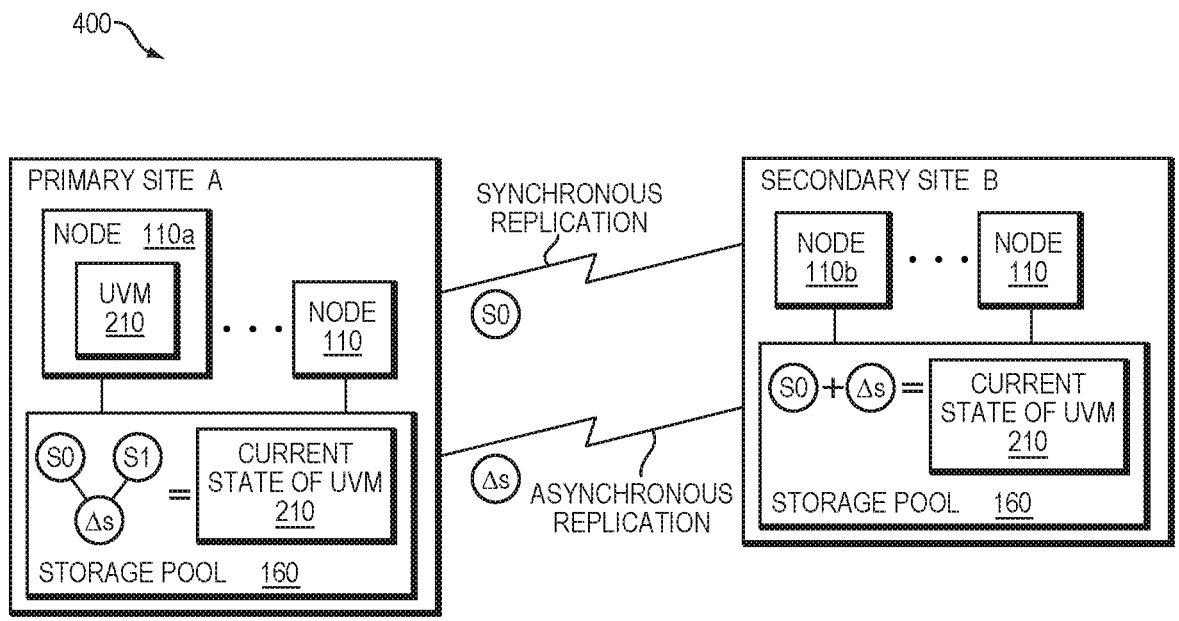
FIG. 4 is a block diagram of an exemplary multi-site data replication environment configured for use in various deployments such as for backup and/or disaster recovery (DR)

FIG. 4 is a block diagram of an exemplary multi-site data replication environment configured for use in various deployments, such as for backup and/or disaster recovery (DR). Illustratively, the multi-site environment 400 includes two sites: primary site A and secondary site B, wherein one or more of the sites represent a datacenter embodied as a cluster 100 having one or more nodes 110. A category of data (e.g., one or more UVMs 210) running on primary node 110*a* at primary site A is designated for replication as protected data to secondary site B (e.g., secondary node 110*b*). In an embodiment, the primary and secondary sites can be either on-premises (private) or cloud (public) sites. A first snapshot S0 of the data is generated at the primary site A and replicated (e.g., via synchronous replication) to secondary site B as a base or "common" snapshot S0. A period of time later, a second snapshot S1 may be generated at primary site A to reflect a current state of the data (e.g., UVM 210). Since the common snapshot S0 exists at sites A-B, only incremental changes (deltas Δs) to the data designated for protection need be sent (e.g., via asynchronous replication) to site B, which applies the deltas (Δs) to R0 so as to synchronize the state of the UVM 210 to the time of the snapshot S2 at the primary site.

A tolerance of how long before data loss will exceed what is acceptable, e.g., to a customer or administrator, determines (i.e., imposes) a frequency of snapshots and replication of deltas to sites, e.g., a data loss tolerance of 60 mins requires snapshots with commensurate delta replication every 60 mins (1 hour)—deemed a Recovery Point Objective (RPO) of 1 hour. Assume the customer provides a protection policy that specifies an amount of tolerable data loss applied to a category of data designated for protection from the primary site to the secondary site. The protection policy is deployed among the sites and includes a schedule that defines the frequency at which snapshots are periodically generated and replicated as (i) mirroring references for synchronous replication or (ii) incremental changes/identifiers for asynchronous replication. Additionally, the schedule may define the number of snapshots needed to be retained to ensure availability of the latest common snapshot used as the recovery point (RP) at each site to satisfy RPO requirements.

Eventually, the RP may not be needed and may be removed (garbage collected) from the primary and/or secondary sites. However, garbage collection (GC) may depend on the actual use case/deployment. For example, if the deployment involves backup and archival of certain RPs (such as health records), there may be regulations that mandate specific retention times for long-term storage of the RPs. Yet if the deployment involves DR, only the latest RP (which is reflective of the current copy of the data/metadata) may be retained (per a protection/retention policy) since the application can be recovered from that RP in the event of a disaster.

Often, various software components may need to share the RP in order to perform their processing, wherein such sharing is implemented through the use of locks associated with the RP. For example, the backup software component may lock the RP to perform its backup operations and then unlock the RP upon completion so that a GC software component may lock the RP to perform its GC operations, if appropriate. It is thus desirable to provide a construct or structure that facilitates management of the RP by the various software components configured to operate on the RP.

The embodiments described herein are directed to a technique configured to enable coordination of unrelated software components (e.g., applications) to facilitate extensive recovery point management on a snapshot or recovery point through the use of a flexible tag structure. The flexible tag structure (tag) is organized and arranged as a {key=value,[value] . . . } structure wherein the key denotes an operation that requires coordination between the unrelated software components and the value(s) denote multi-cardinality that provide parameters for coordination of the operation among the software components. As used herein, the multi-cardinality of the flexible tag structure provides a set of one or more values associated with the key of the tag that enables a software component (application and/or protocol implementation) to insert its value(s) into the tag structure for its specific interpretation. The technique thus provides an extensible model where multiple components/applications/protocols use the tag to coordinate operations on the RP by conveying certain meaning/interpretations of the tag and its values.

Figures 5, 6:
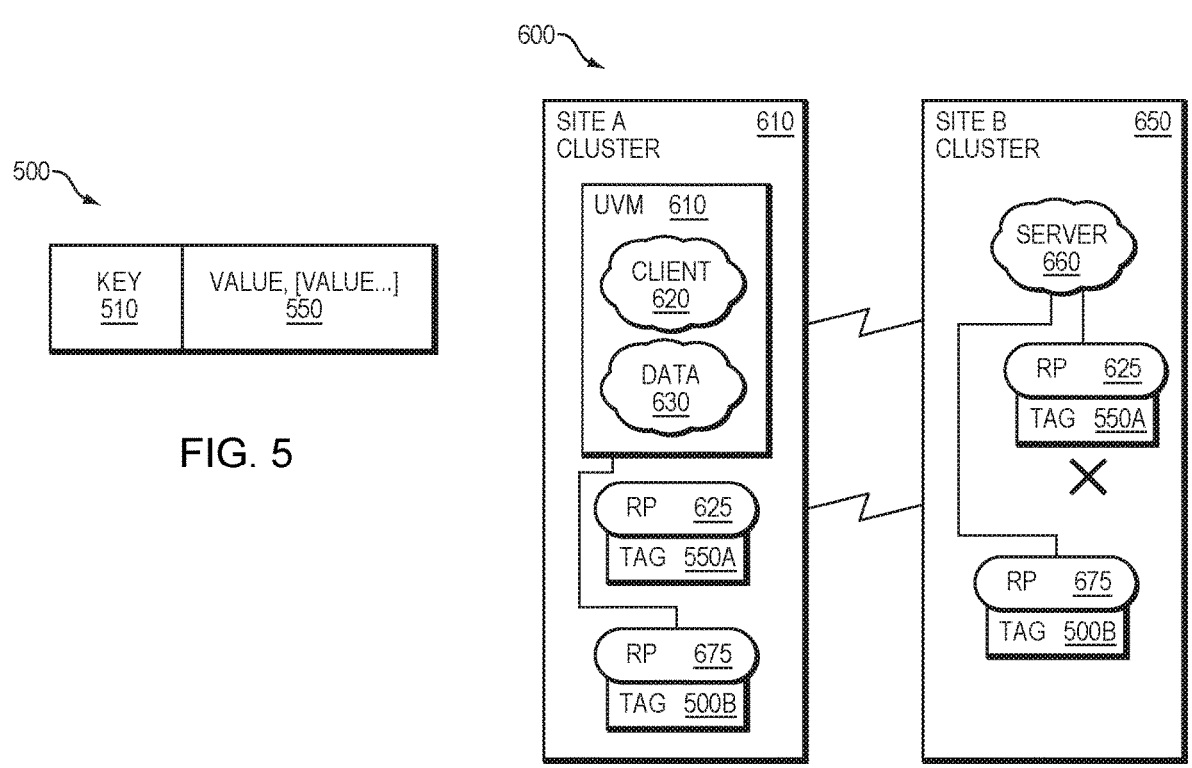
FIG. 5 is a block diagram of a flexible tag structure (tag)
FIG. 6 is a block diagram illustrating an exemplary deployment of the tag associated with a recovery point (RP) in a DR environment.

FIG. 5 is a block diagram of the flexible tag structure (tag 500). In an embodiment, the tag 500 is a data structure associated with (e.g., attached to) a RP to facilitate extensive RP management through the collection of {key=value, [value] . . . } pairs within the flexible structure of the tag. To that end, the tag includes a key 510 configured to indicate an operation that requires coordination between unrelated software components/applications/protocols and one or more values 540 configured to provide parameters. Notably, the {key, value(s)} are organized as pairs for coordination of the operation related to a RP among multiple distinct/unrelated software components, applications and protocols. According to the technique, the tag 500 is further configured to provide multi cardinality (i.e., multiple separate values associated with a single key) of the {key=value1[, value2, . . . valueN] } structure to improve coordination of operations related to the RP among the multiple distinct software components, applications and protocols. Moreover, the technique enables separation of client/server tags to facilitate separate operation of client/client vs. client/server protocols which may be disjoint. Note also that that the key and value(s) can be set and changed using application programming interfaces (APIs) and/or user interfaces (UIs). That is, the tag may be implemented as an externally visible artifact that may be set, modified and/or deleted by explicit APIs/UIs.

Illustratively, the tag 500 enables coordination of various operations by a variety of software components on the same snapshot (RP). A software component can associate one or more tags with a RP to enable support for a variety of workflows related to the RP. New tags can be added, existing tags can be modified and old tags can be deleted from a RP using the APIs. The flexible {key=value,[value] . . . } structure of the tag 500 allows the key and value(s) to be set and changed using the APIs. As noted, coordination of operation/parameters may be between a server (e.g., a system software component/application configured to create, delete and operate on one or more RPs) and a client (e.g., a client software component/application configured to use the RPs) or between clients and other clients. For instance, a backup/archival client application of a third-party system may associate a tag with a RP and, to that end, may insert first and second values for a key of the tag. A GC system software component may interpret the key and values of tag, wherein the key may denote a lock operation that retains and prevents the RP from being removed or deleted while the GC software component is actively performing garbage collection. The first value may identify the backup/archival software component/application as the party requiring retention of the RP and the second value may specify the duration of a retention period for the RP before it may be removed or deleted. In this manner the tag may be used to implement a variety of features such as policies (e.g., retention period) or locks (e.g., identity of a current holder or null). As a result, the tags are labels (e.g., alphanumeric symbolic codes) subject to interpretation by software components implemented to act on specific values for those labels.

In an embodiment, there are two types of tags: (i) system defined tags that are interpreted by a server (e.g., system) which takes appropriate actions based on the value(s) specified in the tag, and (ii) user defined tags that are opaque to (unused by) the server, i.e., the server merely stores these tags and does not perform any action. The system defined tags are used for client/server coordination, wherein the key and format of the value(s) of the tags are defined by a server software component. That is, the system defined tags are only settable and modifiable by the system but may be viewed externally by applications. The user defined tags are used for client/client coordination, where both the key and format for the value(s) are defined by client software components and not interpreted (unused) by the system software component.

For example, a system defined tag may include a key set to "gc_lock" which defines an operation to inhibit garbage collection of a RP and the value(s) could be a combination of {client_id; lock_expiry_time}. The client_id is a unique identifier that identifies the client software component (e.g., client process) that requires retention and non-removal (no garbage collection) of the RP and the lock_expiry_time denotes the time period of retention. The client software component can modify this tag with a new lock_expiry_time if it requires garbage collection (GC) to be inhibited longer. Similarly, the GC software component (e.g., server process) may garbage-collect RPs that do not have a gc_lock tag or have gc_lock tags where the lock_expiry_time expired. Since GC of RPs is typically run by system software, the tag described above is directed to client/server coordination and is defined as a system defined tag.

FIG. 6 is a block diagram illustrating an exemplary deployment of a tag associated with a recovery point (RP) in a DR environment, wherein the tag 500 is illustratively a system defined tag. A customer/client software component (client 620) running in a UVM 210 on primary site A (e.g., cluster 610) actively generates and replicates a first full snapshot of a protected entity (e.g., UVM data 630) and replicates the snapshot as a first RP 625 to a secondary site B of a DR environment 600. Depending on the RPO, subsequent snapshots of the entity are periodically generated using the first RP as a reference to replicate changes or deltas to the secondary site B. To ensure that first RP is persisted and retained at both sites for use as the reference, a tag 500A may be employed and associated with the first RP 625. The key of the tag 500A may be configured to indicate to a consumer/server (GC software component) of the RP that both sites are using the first RP 625 as a reference snapshot, while the values may identify the software component requiring retention of the RP and a retention period for the RP. The GC server software component (server 660) running, e.g., on the secondary site B may examine the tag 500A and interpret the key/values to determine that it cannot remove or GC the first RP 625 until expiry of a retention period. Note that the primary site A faithfully persists and replicates the tag along with its associated snapshot data and metadata as a RP to the secondary site B. The consumer of the RP may interpret the tag 500 and implement a protocol and associated operations (e.g., locking, GC, backup) directed to the RP.

Assume now that a second full snapshot of the protected entity is generated at the primary site A and replicated as a second RP 675 to the secondary site B. A tag 500B associated with second RP 675 is configured to indicate that the second RP 675 may be used as the reference and the tag 500A associated with the first RP 625 may be modified to indicate that it is no longer the reference. As a result, the GC server 660 may remove or GC the first RP 625 (as denoted by the X), since it is no longer interpreted to be preserved (i.e., locked against deletion). Notably, the operations of two unrelated software components (client software component and GC server component) are coordinated to facilitate extensive recovery point management on the RPs through the use of the flexible tag structure.

Another example deployment of a system defined tag may involve an operation to replicate one or more RPs wherein the key of the tags associated with the RPs are set to "replicate_to_target" and the value(s) may be set to, e.g., a site/cluster (or availability zone) to which the RP needs to be replicated. The tag may be set by a snapshot generation software component when a RP is generated and replicated for backup from a primary cluster (site) to a secondary site. A replication manager component executing on the primary site interprets the tag and replicates the RP to the secondary site. Assume a backup client software component runs external to the secondary site to backup (copy) certain RPs (e.g., every $5^{th}$ RP) replicated to the secondary site according to a backup policy. Upon reaching the $5^{th}$ RP, the backup software component (e.g., client process) may attach a tag to the RP indicating the $5^{th}$ RP will be backed up, wherein backup involves reading the data/metadata of the RP and copying that data/metadata to a backup storage repository (cloud storage or tape library). Accordingly, the tag associated with the $5^{th}$ RP is interpreted by a GC software component (e.g., server process) to prevent removal or garbage collection of the RP, to thereby coordinate the operations of two unrelated software components (the backup and GC software components).

Figure 7:
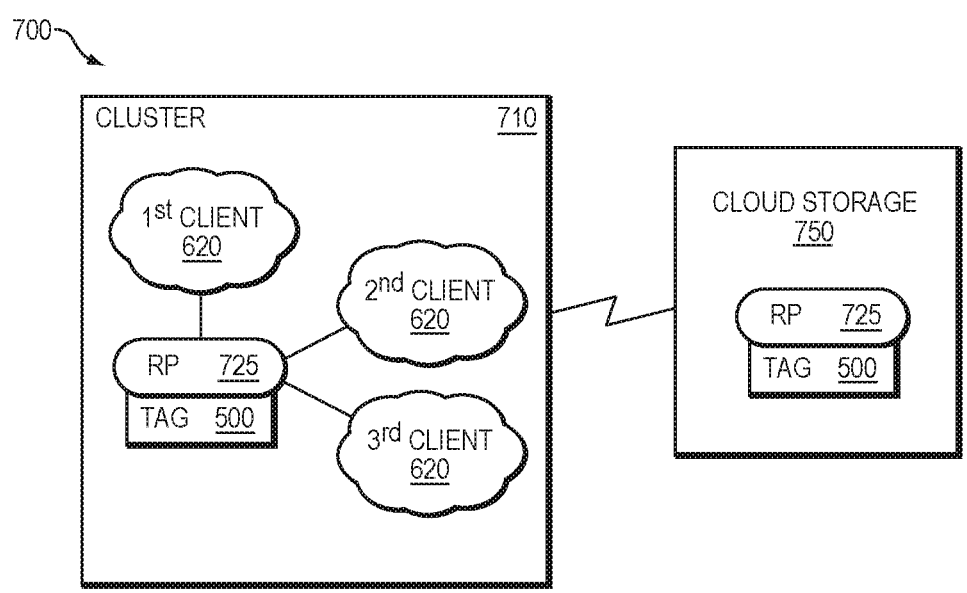
FIG. 7 is a block diagram illustrating an exemplary deployment of the tag associated with a RP in an archival environment.

FIG. 7 is a block diagram illustrating an exemplary deployment of a tag associated with a recovery point (RP) in an archival environment 700, wherein the tag 500 is illustratively a user defined tag. The user defined tag 500 may include a key 510 set by a backup client software component/application (e.g., first client 720) to "archive_to_cloud," which defines an operation to archive a generated RP 725 (e.g., generated by a snapshot generation process based on a predefined schedule) and the value(s) 550 of the tag may define and provide details of the cloud storage 750 where the RP 725 is to be archived. A cooperating cloud archiver client software component (e.g., second client 730) may scan RPs to find the RP 725 with the "archive_to_cloud" tag 500 and, upon locating the RP, copy the RP into the cloud storage 750. The backup client software component and the cloud archiver client software component may apply/examine the "archive_to_cloud" tag 500 on the same cluster 710 or on different clusters, e.g., a cluster that created the RP and another cluster that received a copy of the RP via replication.

Notably, the coordination of operations is not limited to a pair of client software components. In the above example, a virus/malware scanner client software component/application (e.g., a third client) may also act on the RP 725 with an "archive_to_cloud" tag 500 and scan the RP 725 for potential virus/malware infection. If an infection is found, the virus/malware scanner client software component may modify the same tag (made possible by multi-cardinality) in such a way that a cloud archiver client software component interprets it and does not archive the RPs. Note that the tag may also be used as an indexing mechanism to locate the RP (generated at a particular point-in-time) once archived in, e.g., long term cloud storage having a substantially large amount of archived snapshots/RPs.

In an embodiment, use of the flexible structure of the tag 500 may be extended to other deployments where two unrelated software components cooperate to manage one or more RPs (snapshots). For example, a business software component may be configured to modify the data contents of one or more databases. It may be desirable to capture the states of the databases before starting and after finishing the business software component execution. A first snapshot is generated before the start of the business software component execution and a first tag is attached to (associated with) the first snapshot that defines, among other values, a long-term (e.g., years) retention period for the snapshot. A second snapshot is generated after completing the business software component execution and a second tag is associated with the second snapshot that also defines a retention period. Subsequently, the snapshots and associated tags are archived and stored in archival storage (e.g., cloud object store) for a long period of time (e.g., years) in accordance with regulatory requirements. The tags may be interpreted by a GC software component to prevent the removal/garbage collection of the snapshots until expiry of the retention period.

In an embodiment, the technique may be further directed to deployment of tags with RPs for long-term cloud storage (e.g., object store) at an intermediary site (e.g., LTSS 180) wherein the primary and secondary sites communicate through LTSS. The primary and secondary sites are disconnected and the use of tags enables the sites (and the software components executing thereon) to coordinate their operations on the RPs processed by LTSS and stored on the object store. This deployment is particularly advantageous where a secondary application executing on the secondary site does not initially "exist" until a DR event (e.g., failure of the primary application at the primary site) occurs and the secondary application is instantiated.

Figure 8:
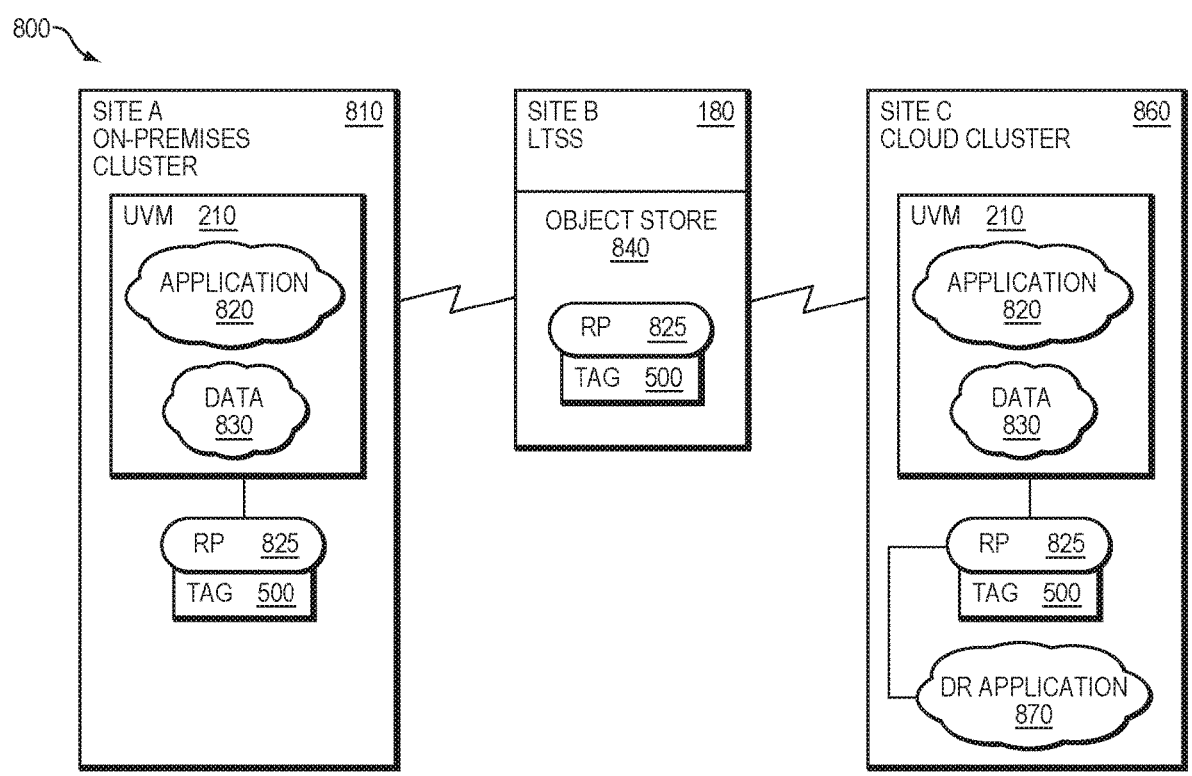
FIG. 8 is a block diagram illustrating an exemplary deployment of the tag associated with a RP in a multi-site DR environment.

FIG. 8 is a block diagram illustrating an exemplary deployment of a tag associated with a recovery point (RP) in a multi-site DR environment 800. A first software component (e.g., application 820) running in a UVM 210 on site A (e.g., on-premises cluster 810) actively generates and replicates snapshots periodically to maintain an RPO, including one or more RPs 825 of its protected entity (UVM data 830) to site B (e.g., LTSS 180 running in a public cloud service provider) for backup storage on an object store 840. The RP 825 contains the latest (newest) snapshot data that is backed up at the object store 840 and includes a tag 500 to ensure, e.g., preservation of a common snapshot reference to maintain RPO. The deployment is cost effective because (i) storage on the object store 840 is cheaper (less expensive) than storage on the on-premises cluster 810; and (ii) LTSS 180 does not require any operational VMs and thus does not consume any compute resources needed to operate such VMs. During failover of the UVM running on the on-premises cluster 810 after a disaster, a cloud cluster 860 at site C is instantiated which, in turn, recovers and instantiates the UVM 210 from the RP 825 stored in LTSS 180 on the cloud cluster 860, so that the recovered UVM 210 executes the application 820 on the cloud cluster 860.

Illustratively, a second software component (e.g., DR application 870) running on the site C selects the RP 825 that is used to recover and instantiate the application 820 running at site C. As a result of the DR event, site A may be unavailable so information as to which RP to select is embodied as the flexible structure of tag 500 persisted along with RP. When performing its RP management functions (e.g., garbage collection of RPs), LTSS 180 examines the tag and interprets its meanings to allow or prevent GC. Although it is not directly responsible for DR. LTSS 180 participates in the DR protocol to interpret the tags to determine whether a RP is needed for a DR event (e.g., one of the sites has set tags interpreted to mean retain the RP) so as to maintain an RPO. If so, LTSS 180 does not GC the RP.

As noted, RP 825 illustratively includes replicated snapshot data of protected entities (e.g., VMs and/or vdisks) and LTSS 180 stores the replicated RP 825 as one or more objects in cloud storage (e.g., object store 840). The metadata associated with the RP 825 (e.g., information relating to the configuration of resources, such as vCPU, memory, networking, needed for the entities) is stored in a local database of site A or in the object store 840 (via LTSS 180). According to the technique, the tag 500 is part of the metadata and is associated with the snapshot data of the RP 825. Notably, although the RP is an immutable data structure, the tag is a mutable data structure stored with the RP.

The technique described herein thus enables use of the tags by different, unrelated software components (e.g., applications and system processes) and different, unrelated protocols in parallel (concurrently) to coordinate operations performed on their attached RPs. Notably, the meaning of each tag is shared among the processes/protocols. For example, assume a backup vendor expresses interest in a snapshot (RP). The technique ensures that logic is implemented to perform operations desired by the backup vendor. To that end, the backup vendor (third-party vendor) may mark (tag) a RP for archival into cloud storage and LTSS may interpret the tag to archive the RP to the cloud storage. If the archival process runs periodically (e.g., an archival interval of once a month), examination and interpretation of the tag by LTSS ensures that the RP is archived during that archival interval. The tag thus allows the technique to interpret commands/interest for a RP on behalf of a third party.

Advantageously, the technique enables use of a flexible tag structure to coordinate operations of unrelated software components and protocols to facilitate extensive recovery point management on a snapshot (RP). The technique is particularly beneficial with the advent of hybrid multi-cloud deployments and the need for transparent application mobility where the RP is the primary object for capturing application state and transporting it between on-premises and cloud datacenters. Illustratively, the technique provides system defined tags that are interpreted by a server which takes appropriate actions based on the value(s) specified in the tag, and user defined tags that are opaque to the server, i.e., the server merely stores these tags and does not perform any action. Various use cases/deployments for the system and user defined tags include (1) a client may lock a recovery point to prevent it from getting garbage collected for a specified duration; (2) the system defined tag may be used to protect a common snapshot across different sites and reduce the chance of full replication; (3) a virtualized file system architecture may require storage of specific attributes related to its architecture on the recovery point metadata and may want to access the attributes; and (4) other use cases where system defined tags can extensively manage recovery points and can avoid reducing new attributes in recovery point generic metadata.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
generating a snapshot of a workload at a primary site of a multi-site environment in accordance with a recovery point objective (RPO);
associating a tag structure with the generated snapshot, the tag structure configured to coordinate one or more operations between a first software component operating on the snapshot and a second software component operating on the snapshot, wherein the first and second software components are distinct;
replicating the snapshot and tag structure as a recovery point to a secondary site of the environment; and
controlling an operation of the first software component directed to the snapshot using the tag structure while maintaining the RPO.

2. The method of claim 1 wherein the first software component includes garbage collection and wherein the second software component includes snapshot generation.

3. The method of claim 1 wherein the operation of the first software component is garbage collection of unneeded data from the snapshot.

4. The method of claim 1 further comprising:
organizing the tag structure as a key-value structure, wherein the key indicates the operation that requires coordination between the distinct software components and the value indicates multi-cardinality that provides parameters for coordination of the operation among the software components.

5. The method of claim 1 wherein the tag structure includes a tag used as a lock identifying the software component holding the lock.

6. The method of claim 5 wherein the tag structure includes an additional tag indicating an expiry time for the tag used as the lock, and wherein the tag and additional tag are associated with a same key.

7. The method of claim 1 wherein the tag structure is a system defined tag that is used for client/server coordination among the software components and wherein one of the first software component or second software component is a server application configured to take an action based on a value specified in the tag.

8. The method of claim 7 wherein the system defined tag has a key and format of the value defined by the server application.

9. The method of claim 1 wherein the tag structure is a user defined tag for client/client coordination among client applications configured to use a recovery point for the RPO and wherein one of the first software component or second software component is a client application.

10. The method of claim 9 wherein the user defined tag has a key and format of a value defined by the client application and unusable to a server application.

11. A non-transitory computer readable medium including program instructions for execution on a processor, the program instructions configured to:
generate a snapshot of a workload at a primary site of a multi-site environment in accordance with a recovery point objective (RPO);
associate a tag structure with the generated snapshot, the tag structure configured to coordinate one or more operations between a first software component operating on the snapshot and a second software component operating on the snapshot, wherein the first and second software components are distinct;
replicate the snapshot and tag structure as a recovery point to a secondary site of the environment; and
control an operation of the first software component directed to the snapshot using the tag structure while maintaining the RPO.

12. The non-transitory computer readable medium of claim 11 wherein the first software component includes garbage collection and wherein the second software component includes snapshot generation.

13. The non-transitory computer readable medium of claim 11 wherein the operation of the first software component is garbage collection of unneeded data from the snapshot.

14. The non-transitory computer readable medium of claim 11 wherein the program instructions are further configured to:
organize the tag structure as a key-value structure, wherein the key indicates the operation that requires coordination between the distinct software components and the value indicates multi-cardinality that provides parameters for coordination of the operation among the software components.

15. The non-transitory computer readable medium of claim 11 wherein the tag structure includes a tag used as a lock identifying the software component holding the lock.

16. The non-transitory computer readable medium of claim 15 wherein the tag structure includes an additional tag indicating an expiry time for the tag used as the lock, and wherein the tag and additional tag are associated with a same key.

17. The non-transitory computer readable medium of claim 11 wherein the tag structure is a system defined tag that is used for client/server coordination among the software components and wherein one of the first software component or second software component is a server application configured to take an action based on a value specified in the tag.

18. The non-transitory computer readable medium of claim 17 wherein the system defined tag has a key and format of the value defined by the server application.

19. The non-transitory computer readable medium of claim 11 wherein the tag structure is a user defined tag for client/client coordination among client applications configured to use a recovery point for the RPO and wherein one of the first software component or second software component is a client application.

20. The non-transitory computer readable medium of claim 19 wherein the user defined tag has a key and format of a value defined by the client application and unusable to a server application.

21. An apparatus comprising:
a network connecting a node of a primary site to a secondary site of a multi-site environment, the node having a processor configured to execute program instructions configured to:
generate a snapshot of a workload at the primary site in accordance with a recovery point objective (RPO);
associate a tag structure with the generated snapshot, the tag structure configured to coordinate one or more operations between a first software component operating on the snapshot and a second software component operating on the snapshot, wherein the first and second software components are distinct;
replicate the snapshot and tag structure as a recovery point to the secondary site; and
control an operation of the first software component directed to the snapshot using the tag structure while maintaining the RPO.

22. The apparatus of claim 21 wherein the first software component includes garbage collection and wherein the second software component includes snapshot generation.

23. The apparatus of claim 21 wherein the operation of the first software component is garbage collection of unneeded data from the snapshot.

24. The apparatus of claim 21 wherein the program instructions are further configured to:
organize the tag structure as a key-value structure, wherein the key indicates the operation that requires coordination between the distinct software components and the value indicates multi-cardinality that provides parameters for coordination of the operation among the software components.

25. The apparatus of claim 21 wherein the tag structure includes a tag used as a lock identifying the software component holding the lock.

26. The apparatus of claim 25 wherein the tag structure includes an additional tag indicating an expiry time for the tag used as the lock, and wherein the tag and additional tag are associated with a same key.

27. The apparatus of claim 21 wherein the tag structure is a system defined tag that is used for client/server coordination among the software components and wherein one of the first software component or second software component is a server application configured to take an action based on a value specified in the tag.

28. The apparatus of claim 27 wherein the system defined tag has a key and format of the value defined by the server application.

29. The apparatus of claim 21 wherein the tag structure is a user defined tag for client/client coordination among client applications configured to use a recovery point for the RPO and wherein one of the first software component or second software component is a client application.

30. The apparatus of claim 29 wherein the user defined tag has as a key and format of a value defined by the client application and unusable to a server application.

* * * * *